(12) United States Patent
Chen et al.

(10) Patent No.: US 11,423,265 B1
(45) Date of Patent: Aug. 23, 2022

(54) CONTENT MODERATION USING OBJECT DETECTION AND IMAGE CLASSIFICATION

(71) Applicant: Amazon Technologies, Inc., Seattle, WA (US)

(72) Inventors: Hao Chen, Seattle, WA (US); Hao Wu, Seattle, WA (US); Hao Li, Kirkland, WA (US); Michael Quang Thai Lam, Lynnwood, WA (US); Xinyu Li, Bothell, WA (US); Kaustav Kundu, Seattle, WA (US); Meng Wang, Seattle, WA (US); Joseph P Tighe, Seattle, WA (US); Rahul Bhotika, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 16/917,721

(22) Filed: Jun. 30, 2020

(51) Int. Cl.
| | | |
|---|---|---|
| *G06K 9/62* | (2022.01) | |
| *G06T 7/10* | (2017.01) | |
| *G06T 11/20* | (2006.01) | |
| *G06N 20/00* | (2019.01) | |

(52) U.S. Cl.
CPC ............ *G06K 9/628* (2013.01); *G06N 20/00* (2019.01); *G06T 7/10* (2017.01); *G06T 11/20* (2013.01); *G06T 2207/20081* (2013.01); *G06T 2207/20084* (2013.01); *G06T 2207/20132* (2013.01); *G06T 2210/12* (2013.01); *G06T 2210/22* (2013.01)

(58) Field of Classification Search
CPC .. G06V 10/464; G06K 9/6228; G06K 9/6226; G06T 11/001
See application file for complete search history.

(56) References Cited

U.S. PATENT DOCUMENTS

| | | | |
|---|---|---|---|
| 7,034,848 B2 | 4/2006 | Sobol | |
| 7,149,662 B2* | 12/2006 | Bridson | G06Q 30/0621 359/896 |
| 7,480,414 B2* | 1/2009 | Brown | G06V 20/40 706/20 |
| 7,991,715 B2 | 8/2011 | Schiff et al. | |
| 8,175,376 B2 | 5/2012 | Marchesotti et al. | |
| 8,634,644 B2* | 1/2014 | Chiu | G06V 30/413 382/164 |
| 8,949,878 B2 | 2/2015 | Dimitrova et al. | |
| 9,237,125 B1* | 1/2016 | Bardgett | H04L 63/02 |

(Continued)

*Primary Examiner* — Yosef Kassa
(74) *Attorney, Agent, or Firm* — Robert C. Kowert; Kowert, Hood, Munyon, Rankin & Goetzel, P.C.

(57) ABSTRACT

Methods, systems, and computer-readable media for content moderation using object detection and image classification are disclosed. A content moderation system performs object detection on an input image using one or more object detectors. The object detection finds one or more elements in the input image. The content moderation system performs classification based at least in part on the input image using one or more image classifiers. The classification determines one or more values indicative of one or more content types in the input image. The content moderation system determines one or more scores for one or more content labels corresponding to the one or more content types. At least one of the scores represents a finding of one or more of the content types in the input image. The content moderation system generates output indicating the finding of the one or more of the content types.

20 Claims, 12 Drawing Sheets

(56) References Cited

U.S. PATENT DOCUMENTS

| | | |
|---|---|---|
| 9,443,169 B2 | 9/2016 | Duan et al. |
| 9,445,151 B2 * | 9/2016 | Greene |
| 9,501,831 B2 * | 11/2016 | Nachman ................ G06T 7/579 |
| 9,613,448 B1 * | 4/2017 | Margolin ............... G06T 11/001 |
| 9,955,218 B2 | 4/2018 | Panchaksharaiah et al. |
| 10,325,351 B2 | 6/2019 | Rad et al. |
| 10,572,757 B2 | 2/2020 | Graham et al. |
| 10,671,854 B1 | 6/2020 | Mahyar et al. |

* cited by examiner

CONTENT MODERATION USING OBJECT DETECTION AND IMAGE CLASSIFICATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

For example, distributed systems may be used to implement Internet-accessible services such as discussion forums and social media networks. Discussion forums and social media networks may permit millions of users to post text, images, video, and other forms of user-provided content. Some content provided by users to a particular service may violate content standards of the service, and the service may seek to remove the offending content. To identify such content, services may employ large numbers of human content reviewers who manually review user-provided text, images, and video. Such manual review may be expensive for the service, time-consuming for the reviewers, and prone to human error because individual reviewers may differ in their approaches.

Figure 1:
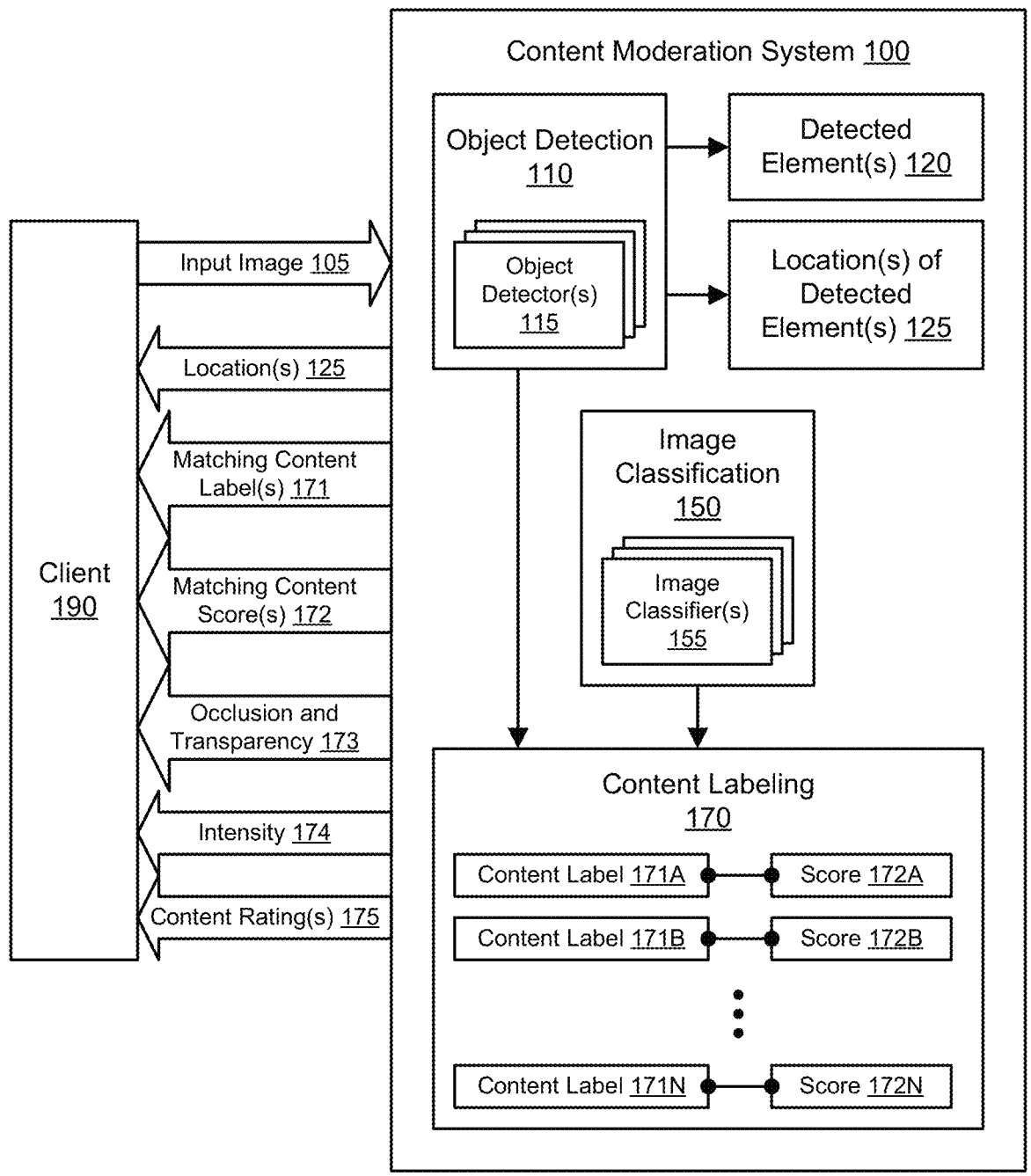
FIG. 1 illustrates an example system environment for content moderation using object detection and image classification, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for content moderation using object detection and image classification are described. Internet-accessible services such as discussion forums and social media networks may permit millions of users to post text, images, video, and other forms of user-provided content. Some content provided by users to a particular service may violate content standards of the service and may be deemed objectionable content. For example, objectionable content may include content of a suggestive or "not safe for work" nature, graphically violent content, content that promotes bigotry, and so on. Manual review of user-provided content may be expensive for the service, time-consuming for the content reviewers, and prone to human error because individual reviewers may differ in their approaches. To address these challenges, automated review may be employed using computer-executable approaches to identify objectionable content. For example, some prior approaches for automated review have used image classifiers to classify images as simply "safe" or "unsafe." Such approaches may lack sufficient granularity for effective moderation of content on Internet-accessible services.

The aforementioned challenges, among others, are addressed by embodiments of the techniques described herein, whereby a content moderation system may perform automated detection of objectionable content in images (including video frames) using both object detection and image classification. The content moderation system may achieve a higher accuracy than the use of image classification alone. Using object detection techniques, the content moderation system may detect one or more objects in an input image. For example, the object detection may attempt to find exposed body parts, weapons, hate symbols, and/or other elements that may often be associated with objectionable content according to the standards of a particular discussion forum or social media network. The object detection may identify the locations of the detected elements (e.g., as bounding boxes). Using image classification techniques, the content moderation system may also score an input image in one or more categories of objectionable content such as suggestive imagery, violent imagery, hate speech, and so on. The image classification may also be used for cropped portions of the input image in which any objectionable elements were found.

The content moderation system may generate finer-grained and more useful output than the use of image classification alone. For example, the content moderation system may report the labels for categories of objectionable content that the input image is found to contain (e.g., suggestive content, violent content, rude gestures, hate speech, and so on). The content moderation system may report scores for one or more categories of objectionable content. The content moderation system may report the degree to which objects are covered or transparent (e.g., partially covered, fully uncovered, and so on). The content moderation system may report the locations of the objectionable elements within the input image. Using the bounding boxes or other location information, the content moderation system may automatically blur, pixelate, or otherwise obscure regions of the image in which objectionable elements are found. Using this fine-grained output of the content moderation system, Internet-accessible services in which users provide images and video may be moderated automatically, quickly, and effectively.

As one skilled in the art will appreciate in light of this disclosure, embodiments may be capable of achieving certain technical advantages, including some or all of the following: (1) improving the accuracy of identification of content in still images and video frames by performing both object detection and image classification; (2) improving the accuracy of identification of content in still images and video frames by expanding the region around detected objects to capture additional context relevant to classification; (3) improving the latency of image blurring or pixelation by using automated techniques to identify bounding boxes of elements to be blurred or pixelated; (4) improving the latency of content moderation by performing object detection and image classification concurrently; and so on.

FIG. 1 illustrates an example system environment for content moderation using object detection and image classification, according to some embodiments. A content moderation system 100 may perform automated detection of objectionable content in images (e.g., still images and video frames) using both object detection 110 and image classification 150. A client 190 may provide an input image 105 to the content moderation system 100. The client 190 may represent another computer system or service, e.g., a service associated with an Internet-accessible social media network, discussion forum, or other channel by which users may post images. For example, if a user adds a new image to a social media network, a service associated with that network may ask the content moderation system 100 to perform one or more content moderation tasks with respect to the image. In various embodiments, the one or more content moderation tasks may include, for example, classifying the image in one or more categories of objectionable content, identifying portions of the image containing elements of objectionable content, blurring or pixelating the portions of the image containing elements of objectionable content, and so on. The content moderation task(s) may be invoked by the client 190 via one or more application programming interfaces (APIs) or user interfaces. Using the output of the content moderation system 100, the client 190 may perform various content moderation tasks such as refusing to post an image, removing a previously posted image, flagging an image for manual review, replacing the image with a version in which objectionable content has been blurred or pixelated, taking action regarding a user account that provided the image, and so on.

In some embodiments, images (including video frames) may be assessed by the content moderation system 100 according to a default set of content standards. A set of content standards may represent a policy that particular types of imagery (e.g., suggestive or "Not Safe for Work" imagery, graphically violent imagery, rude or offensive gestures, promotion of hate symbols, and so on) are forbidden from being posted or disseminated via a website, app, or other Internet-accessible channel. In some embodiments, images (including video frames) may be assessed by the content moderation system 100 according to a client-specific or region-specific set of content standards. In some embodiments, images (including video frames) may be classified or assigned scores by the content moderation system 100 for a client-specific or region-specific set of content labels representing categories of content that may violate the client-specific or region-specific set of content standards. Images (including video frames) that violate a set of content standards may be referred to herein as objectionable images or objectionable content. An image with objectionable content may be assigned to one or more categories or types of objectionable content, and the categories or types may be associated with human-readable labels (e.g., "suggestive," "violent," and so on). In some embodiments, the content moderation system 100 may be used to find images with objectionable content as well as images that contain other types of content that may be of interest to the client 190. For example, the content moderation system 100 may be used to find clothing items with trademarked symbols that the client 190 seeks to remove or obscure from images or video frames.

By using both object detection 110 and image classification 150, the content moderation system 100 may achieve a higher accuracy than the use of image classification alone. The content moderation system 100 may perform object detection 110 using one or more object detectors 115. The object detector(s) 115 may be implemented using computer vision and image processing techniques to detect instances of objects in digital images. The object detector(s) 115 may represent one or more machine learning models or deep learning models. For example, machine learning models may be trained using sets of training images to identify objects in one or more classes. Using prior approaches, object detectors were typically configured to recognize objects such as human faces, human bodies, automobiles, and so on. The object detector(s) 115 may be configured (e.g., trained) to recognize objects that are often associated with types or categories of objectionable content. For example, the object detector(s) 115 may be configured to detect human body parts that are often associated with suggestive or "Not Safe for Work" imagery, weapons or gory elements that are often associated with violent imagery, hand gestures that may be considered rude or offensive, hate symbols that are often associated with promotion of bigotry, and so on.

In some embodiments, the object detector(s) 115 may be configured to detect variations on object classes such as body parts that are fully covered (e.g., by clothing or some other object), partially covered, fully uncovered, semi-transparent, covered by a semi-transparent layer, and so on. In some embodiments, the object detector(s) 115 may be configured to detect the intensity of objectionable content in an image 105. The intensity may relate to the amount of objectionable content in the image 105 (e.g., the amount of blood in a violent image), the proximity of items within the image (e.g., the proximity of illegal drugs to a person), how items are being used in the image, and/or other contextual attributes.

In some embodiments, the object detection 110 may output information describing one or more detected elements 120 in the input image 105. The information describing one of the detected elements 120 may include, for example, the name of the object class that was detected, a score representing a confidence level that the object was properly detected, the number of instances of the object class in the input image 105, a degree to which the object is uncovered or transparent, the intensity of the content, and/or other metadata describing the detected element(s). In some embodiments, the object detection 110 may output location information 125 describing the spatial location(s) of one or more detected elements in the input image 105. For example, for a particular element of objectionable content, the location data 125 may include a bounding box representing two-dimensional coordinates within the image in which the element is found. As another example, for a particular element of objectionable content, the location data 125 may include the center and radius of a circle within the image in which the element is found. The location data 125 may be returned to the client 190. In some embodiments, the location data 125 may be used to generate image crop(s) representing portions of the input image 105 containing the detected element(s). In some embodiments, the location data 125 may be used to blur, pixelate, or otherwise obscure portions of the input image 105 containing the detected element(s).

The content moderation system 100 may perform image classification 150 using one or more image classifiers 155. The image classifier(s) 155 may be implemented using computer vision and image processing techniques to classify digital images in one or more classes. The image classifier(s) 155 may represent one or more machine learning models or deep learning models. For example, machine learning models may be trained using sets of training images to classify images in one or more classes. The image classifier(s) 155 may be configured (e.g., trained) to classify images according to types or categories of objectionable content. For example, the image classifier(s) may be used to analyze the input image 105 and assign the input image 105 to one or more categories such as "suggestive," "violent," "hate speech," and so on. The category labels may be part of a hierarchy or taxonomy. For example, a broader "suggestive" category may contain additional categories such as "swimwear," "underwear," and so on. The image classification 150 may generate output values for the input image 105 with respect to one or more categories of objectionable content. The image classification 150 may assign scores for the input image 105 in one or more categories of objectionable content.

In some embodiments, the image classification 150 may also be applied to cropped portions of the input image in which any objectionable elements 120 were found. The original input image 105 and the image crop(s) representing the detected objects may be provided as input to the image classification 150. The image classification 150 may generate output values such as feature vectors and/or scores for the input image 105 as well as for the image crop(s) representing the detected objects. The image classification 150 may aggregate the feature vectors and/or scores for the input image 105 and the image crop(s) to produce a final set of one or more feature vectors and/or scores. For example, the aggregation may find the maximum value or score for a particular content category among the original image 105 and the image crop(s). As another example, the aggregation may find the average value or score for a particular content category for the original image 105 and the image crop(s).

The output of the image classification 150 may represent one or more raw scores for the individual content categories or labels. A raw score may represent a confidence level (e.g., between 0 and 100%) that the image 105 belongs to a particular category. The system 100 may perform additional processing or calibration of these scores. For example, the raw scores may be normalized or mapped to another range of values. As another example, the raw scores may be compared to threshold values, and scores below the threshold values may be discarded and not reported to the client 190.

The content moderation system 100 may perform content labeling 170. Using the content labeling 170, the system 100 may determine one or more content labels that characterize the input image 105. As discussed above, the labels may describe broader categories of objectionable content such as "suggestive," "violent," "hate speech," and so on. The labels may describe narrower categories of objectionable content within the broader categories. The content labeling 170 may use the scores generated by the image classification 150 or the processed or calibrated version of those scores. For example, the content labeling 170 may associate a first content label 171A with a score 172A, a second content label 171B with a score 172B, an Nth content label 171N with a score 172N, and so on. In some embodiments, the content labeling 170 may assign the input image 105 to one or more categories of content according to threshold values. For example, the input image 105 may be assigned to the content label 171A because the score 172A exceeds a threshold value, but the input image 105 may not be assigned to the content label 171B because the score 172B does not exceed a threshold value. If the input image 105 is assigned to a particular category represented by a content label, the image may be said to match that label.

The content moderation system 100 may generate finer-grained and more useful output for the client 190 than the use of image classification alone. For example, the content moderation system 100 may report to the client 190 the matching content labels 171 for categories of objectionable content that the input image is found to contain (e.g., suggestive imagery, violent imagery, hate speech, and so on). In some embodiments, the content moderation system 100 may report to the client 190 the scores 172 for one or more categories of objectionable content that the image 105 matches. In some embodiments, the content moderation system 100 may report content labels and/or scores for categories of content that the image 105 was not found to contain. In some embodiments, the content moderation system 100 may report to the client 190 data 173 indicating the degree to which detected objects 120 are occluded or transparent (e.g., partially covered, fully uncovered, and so on). In some embodiments, the content moderation system 100 may report to the client 190 the location(s) 125 of the objectionable elements 120 within the input image 105.

In some embodiments, the content moderation system 100 may report to the client 190 data indicating the intensity 174 of objectionable content. As discussed above, the intensity 174 may relate to the amount of objectionable content in the image 105, the proximity of items within the image, how items are being used in the image, and/or other contextual attributes. In some embodiments, the content moderation system 100 may report to the client 190 one or more client-specific or region-specific content ratings 175. The content rating(s) 175 may be generated by mapping the content labels 171A-171N and/or scores 172A-172N to a range of ratings associated with the client 190 or a region of interest to the client. For example, for an intended audience in the United States, the content in the image 105 may be mapped to conventional film ratings such as G, PG, PG-13, R, and so on. The content rating(s) 175 may vary from region to region and/or client to client. The output(s) of the content moderation system 100 may be provided to the client 190 via one or more application programming interfaces (APIs) or user interfaces. Using this fine-grained output of the content moderation system 100, Internet-accessible services in which users provide images and video may be moderated automatically, quickly, and effectively.

In some embodiments, the content moderation system 100 may analyze a sequence of input images representing frames of a digital video. For example, the entire video may be provided as input to the system 100, and the system may perform object detection 110 and image classification 150 on every Nth frame. Aggregate content score(s) 172 may be determined for the entire video using aggregation of scores for individual frames, and the content label(s) 171 may be determined based (at least in part) on the aggregate content score(s). The location data 125 may indicate the temporal location of objectionable content within a video, e.g., using one or more timestamps or time ranges within the video. The location data 125 may include spatial-temporal information that not only indicates the temporal locations (e.g., identifiers of frames) but also indicates spatial locations (e.g., locations within each frame) of objectionable content. Using this information, pixelating functions may be designed for content moderation of video: e.g., blocking, skipping, black-screening, and/or fast-forwarding the series of frames that may contain objectionable content or replacing the frames with other content, e.g., advertisements. In some embodiments, only the objectionable areas within a video frame may be pixelated instead of the entire frame, thus leaving some portions of the frame unaltered.

In some embodiments, the content moderation system 100 may include additional stages not shown. For example, the system 100 may use two or more stages of object detection. In the first stage, object detection may be performed to find people in an image. The first stage may output a bounding box or other location data for any people that are found in the image. In the second stage, object detection may be performed as discussed above to find specific body parts, symbols, and so on within the bounding box(es) of any detected people. The two-stage object detection may be used for greater accuracy.

In some embodiments, the content moderation system 100 may be implemented within a service-oriented system comprising a plurality of services. The services may include services corresponding to the content moderation system 100 itself, the client 190, and so on. Each service may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. A service or application may utilize numerous micro-services. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

A service may offer one or more application programming interfaces (APIs) or other programmatic interfaces through which another service may request the functionality of the service. The service-oriented system may be configured to process requests from various internal or external systems, such as client computer systems or computer systems consuming networked-based services (e.g., web services). For instance, an end-user operating a web browser on a client computer system may submit user-provided image data, and that submission may initiate a chain of service calls to a discussion forum or social media network and then to the content moderation system 100. In another example, a computer system may submit a request for a web service (e.g., a data storage service, a data query, etc.). In general, services may be configured to perform any of a variety of processes.

The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services and/or micro-services.

In one embodiment, the computing resources for one or more services (potentially including aspects of the content moderation system 100) may be automatically allocated from one or more pools of computing resources. The pool(s) of computing resources may be managed by a resource manager associated with the service-oriented system. The pool(s) may represent a plurality of computing resources which are available to various services in a service-oriented system. The pool(s) may include a plurality of computing resources such as virtual compute instances that may be heterogeneous or homogeneous in their hardware capabilities and software configuration. The computing resources in the pool may be usable to provide or otherwise implement one or more services.

In one embodiment, the resource manager may manage a multi-tenant, cloud-based provider network that includes the pool(s) of computing resources. The provider network may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. In one embodiment, an operator of the provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources.

Figure 8:
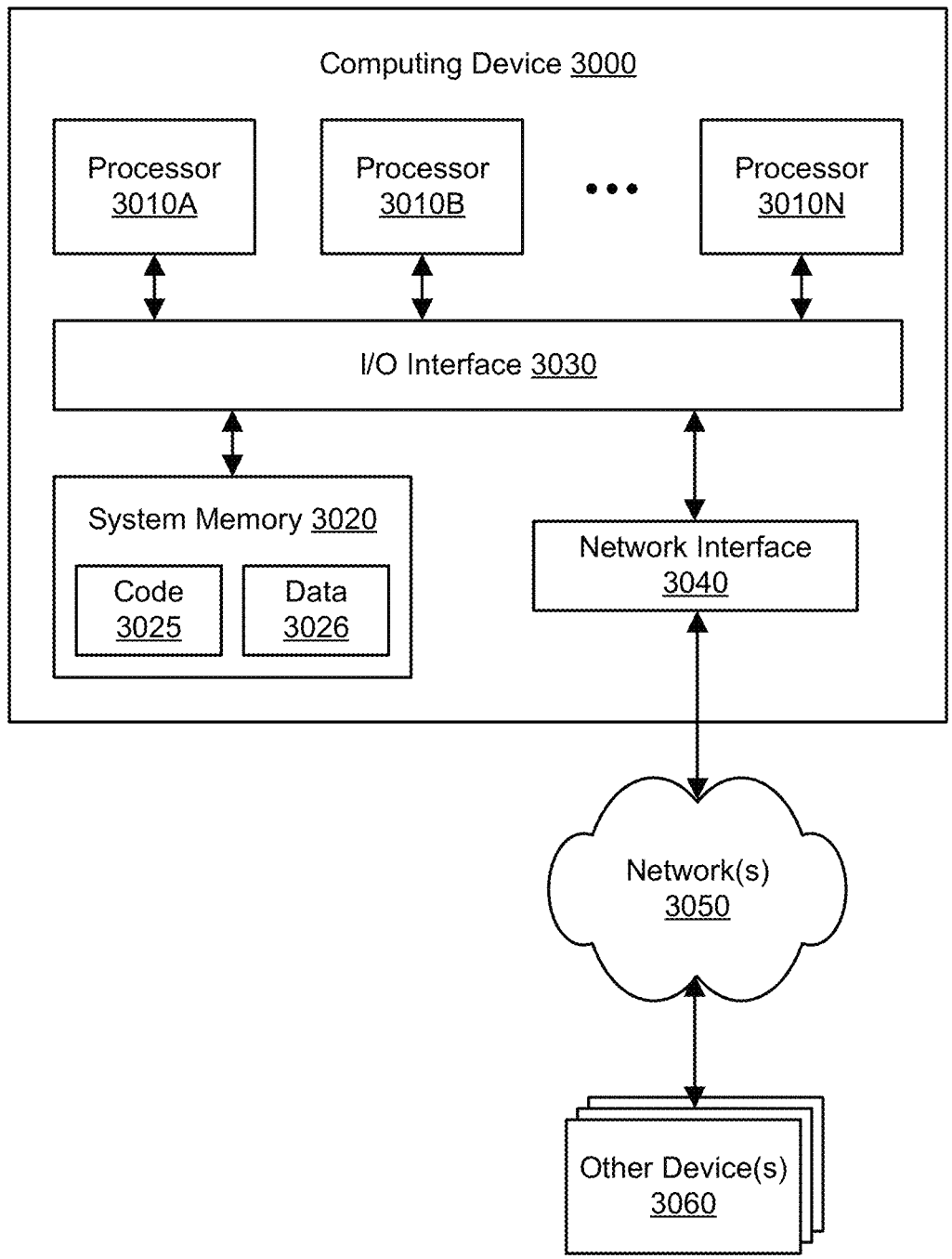
FIG. 8 illustrates an example of a computing device that may be used in some embodiments.

The content moderation system 100 may include one or more computing devices, any of which may be implemented by the example computing device 3000 illustrated in FIG. 8. In various embodiments, the functionality of the different services, components, and/or modules of the content moderation system 100 may be provided by the same computing device or by different computing devices. If any of the various components of the content moderation system 100 are implemented using different computing devices, then the respective computing devices may be communicatively coupled, e.g., via a network. In one embodiment, aspects of the content moderation system 100 may be performed automatically and/or programmatically, e.g., by executing program instructions without direct user intervention. In some embodiments, aspects of the system 100 may be implemented at edge locations or on client devices to reduce latency.

Figure 2A:
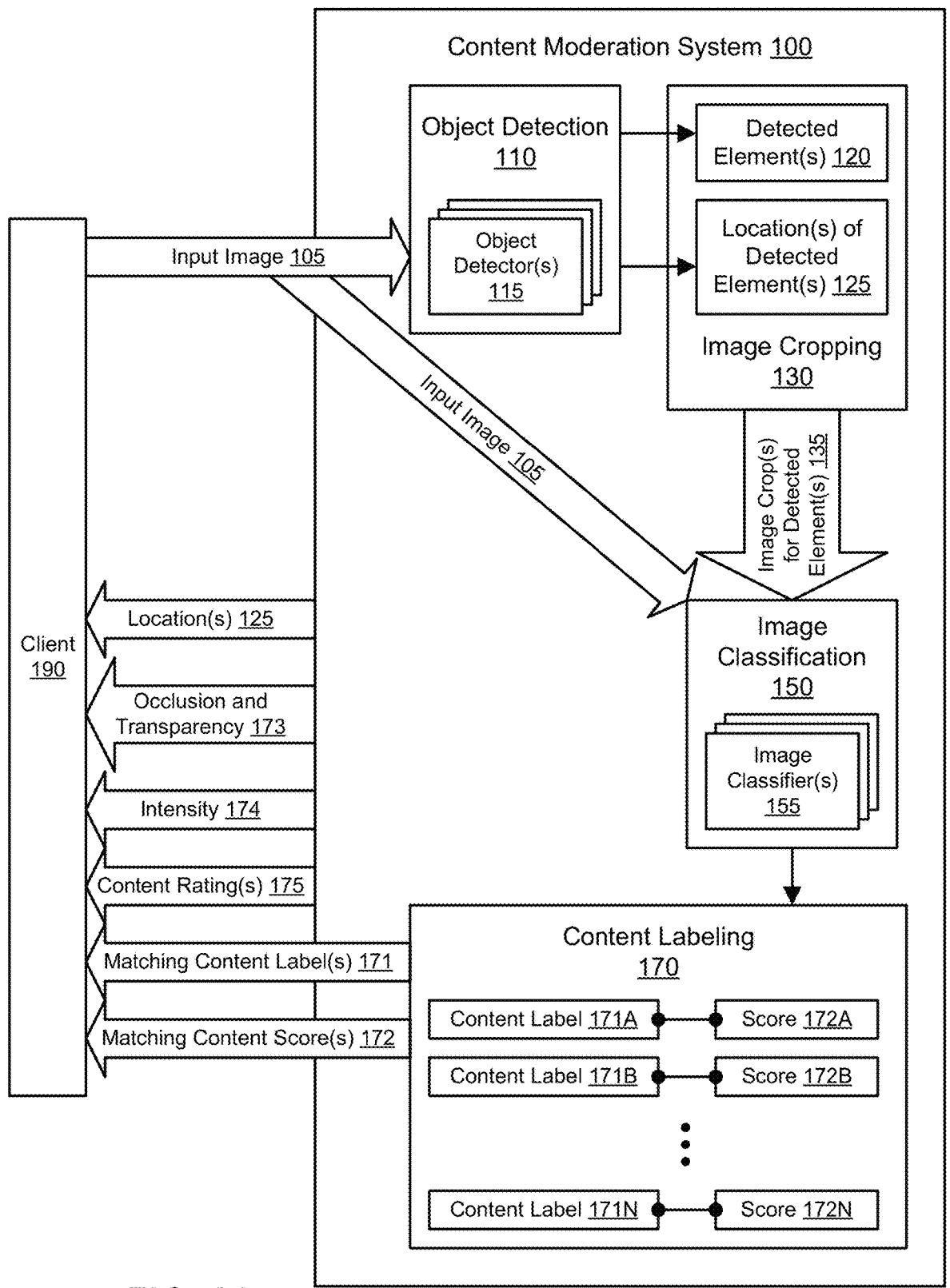
FIG. 2A and FIG. 2B illustrate further aspects of the example system environment for content moderation using object detection and image classification, including a two-stage approach, according to some embodiments.

FIG. 2A illustrates further aspects of the example system environment for content moderation using object detection and image classification, including a two-stage approach, according to some embodiments. Using the two-stage approach, the object detection 110 and image classification 150 may be performed sequentially such that the image classification may be performed using output of the object detection. As discussed above, the object detection 110 may output information describing the detected element(s) 120 as well as location information 125 for the element(s). For example, for a particular element of objectionable content, the location data 125 may include a bounding box representing two-dimensional coordinates within the image in which the element is found. The content moderation system 100 may include a component for image cropping 130 that uses the output of the object detection 110 stage. The image cropping 130 may produce, for each of the detected element(s) 120, a cropped portion of the original input image 105. The location data 125 may be used to generate image crop(s) 135 representing portions of the input image 105 containing the detected element(s) 120. In some embodiments, a particular image crop for a particular element may be produced by removing the portions of the original image 105 outside of the bounding box for that element.

The image cropping 130 may provide the image crop(s) 135 for the detected element(s) 120 to the image classification 150 stage. The original input image 105 and the image crop(s) 135 representing the detected objects may be provided as input to the image classification 150. The image classification 150 may generate output values and/or scores for the input image 105 as well as for the image crop(s) 135 representing the detected objects. The image classification 150 may aggregate the output values and/or scores for the input image 105 and the image crop(s) 135 to produce a final set of one or more output values and/or scores. For example, the aggregation may find the maximum value or score for a particular content category among the original image 105 and the image crop(s) 135. As another example, the aggregation may find the average value or score for a particular content category for the original image 105 and the image crop(s) 135.

Figure 2B:
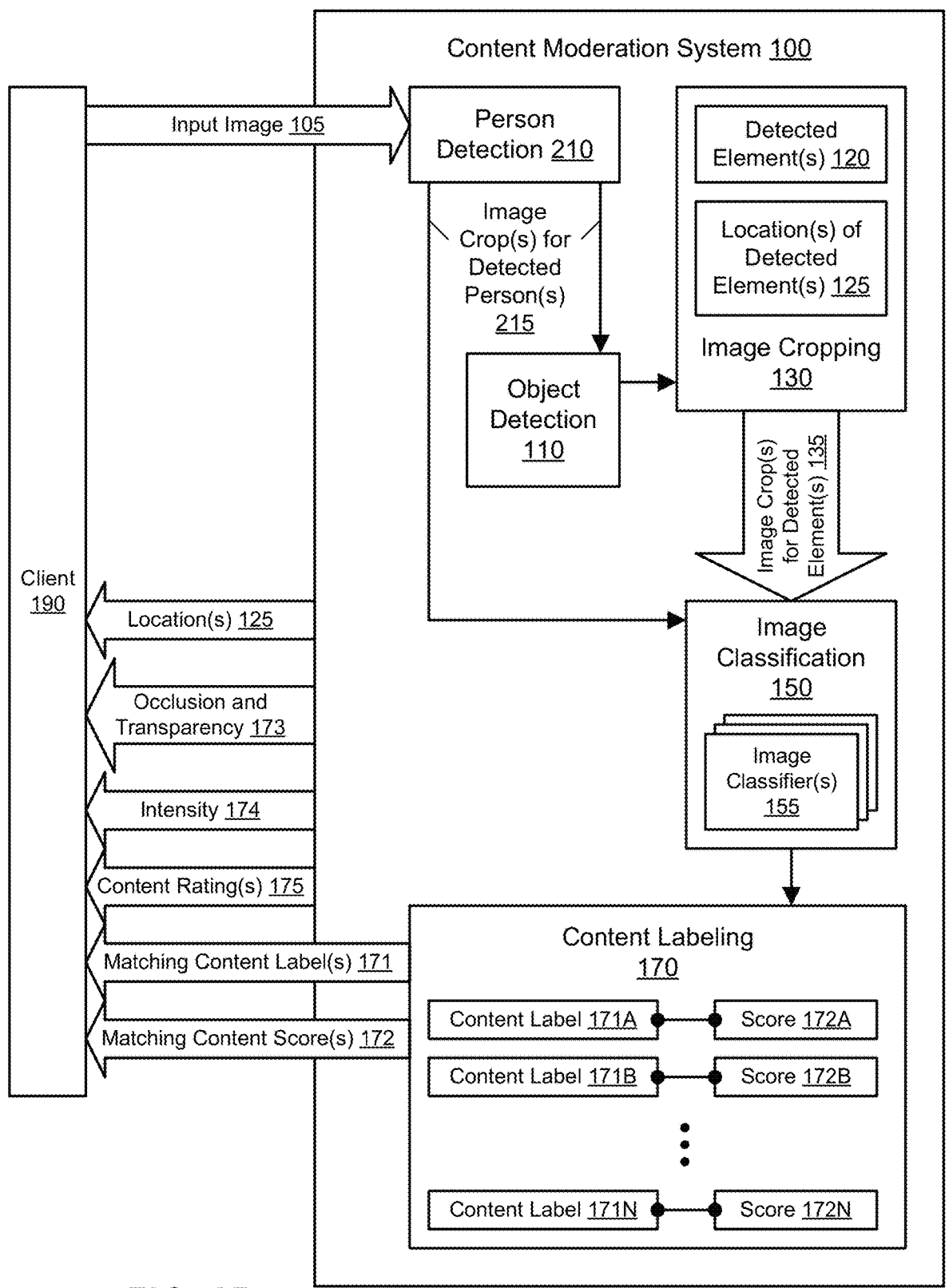

FIG. 2B illustrates further aspects of the example system environment for content moderation using object detection and image classification, including a two-stage approach plus the use of a person detector, according to some embodiments. A component 210 for person detection may use object detection techniques to identify one or more persons in the input image 105. As discussed above with respect to object detection 110, the person detection 210 may include one or more object detectors that are trained to identify human forms using machine learning techniques. The person detection 210 may output one or more image crops 215 including the detected person(s) but excluding other portions of the input image 105, e.g., where the crops 215 are generated using bounding boxes or other location information for the detected person(s). In some embodiments, the person detection 210 may output the bounding boxes or other location information for the detected person(s) to the client 190. By performing the object detection 110 and image classification 150 on particular portions of the input image 105 that represent humans and not necessarily on less relevant portions of the input image, the accuracy of the image analysis for content moderation may be improved.

Figure 3:
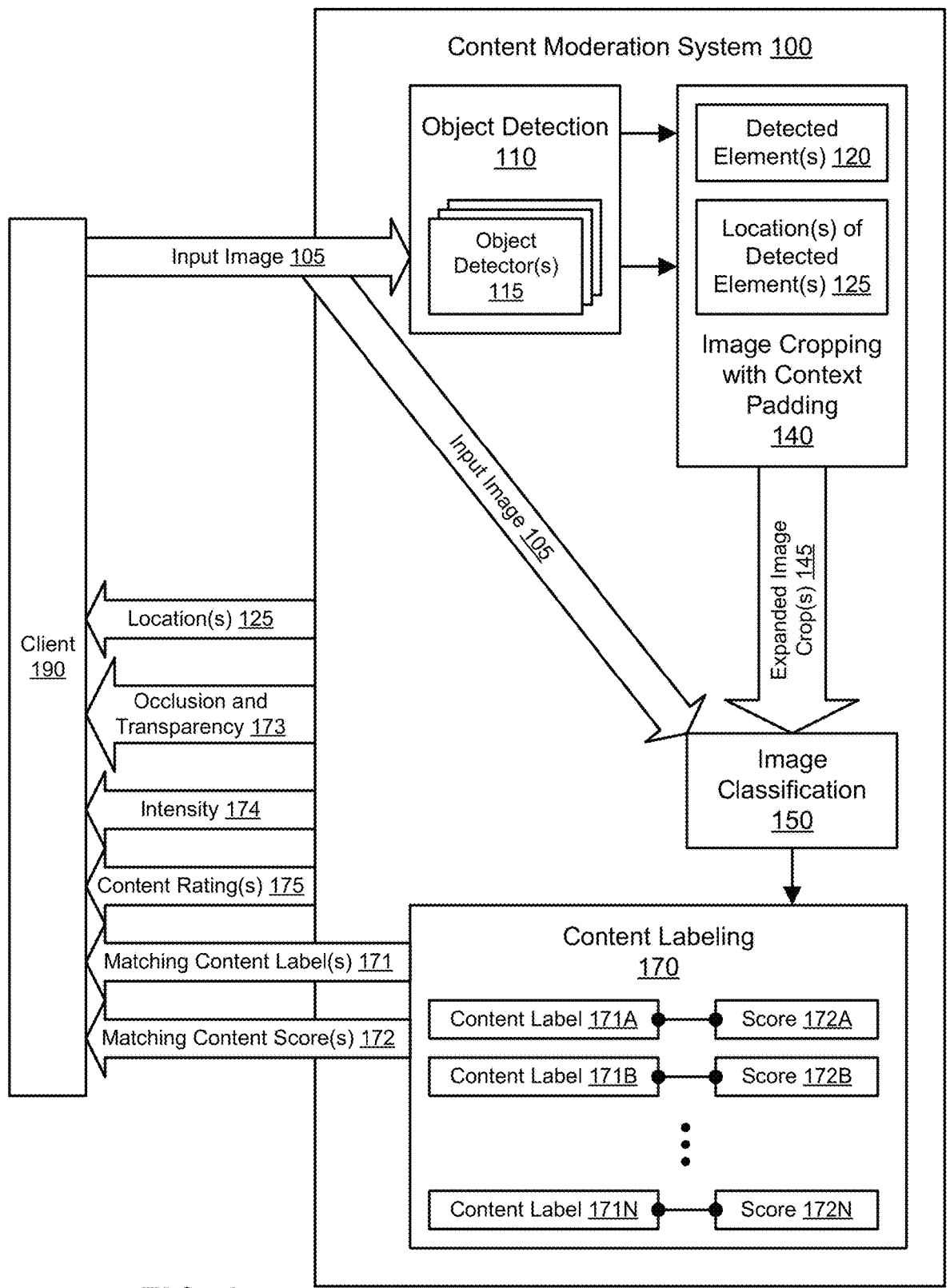
FIG. 3 illustrates further aspects of the example system environment for content moderation using object detection and image classification, including the use of content padding for image crops in a two-stage approach, according to some embodiments.

FIG. 3 illustrates further aspects of the example system environment for content moderation using object detection and image classification, including the use of content padding for image crops in a two-stage approach, according to some embodiments. As discussed above, the image cropping component 130 may produce one or more image crops 135 representing portions of the image 105 in which potentially objectionable elements were found. In some embodiments, the image crop(s) 135 may contain insufficient image data for proper analysis outside of the image data for the detected element(s) themselves. To address this challenge, the content moderation system 100 may include a component for context padding 140 that expands the image data around the detected element(s) 120 in the image crop(s) 135.

The context padding 140 may produce expanded image crop(s) 145 containing additional image data (e.g., rows and/or columns of pixels) that may capture additional context useful for image classification 150. The image classification 150 may be applied to the original image 105 along with the expanded image crop(s) 145. The expanded image crop(s) 145 may be generated using the input image 105, the location data 125, and one or more expansion parameter values. For example, the area of a bounding box may be expanded by 20% on each side to capture the additional context in an expanded image crop. In some embodiments, the expansion parameters may vary according to the type of detected element so that sufficient context can be captured for the image classification 150.

Figure 4A:
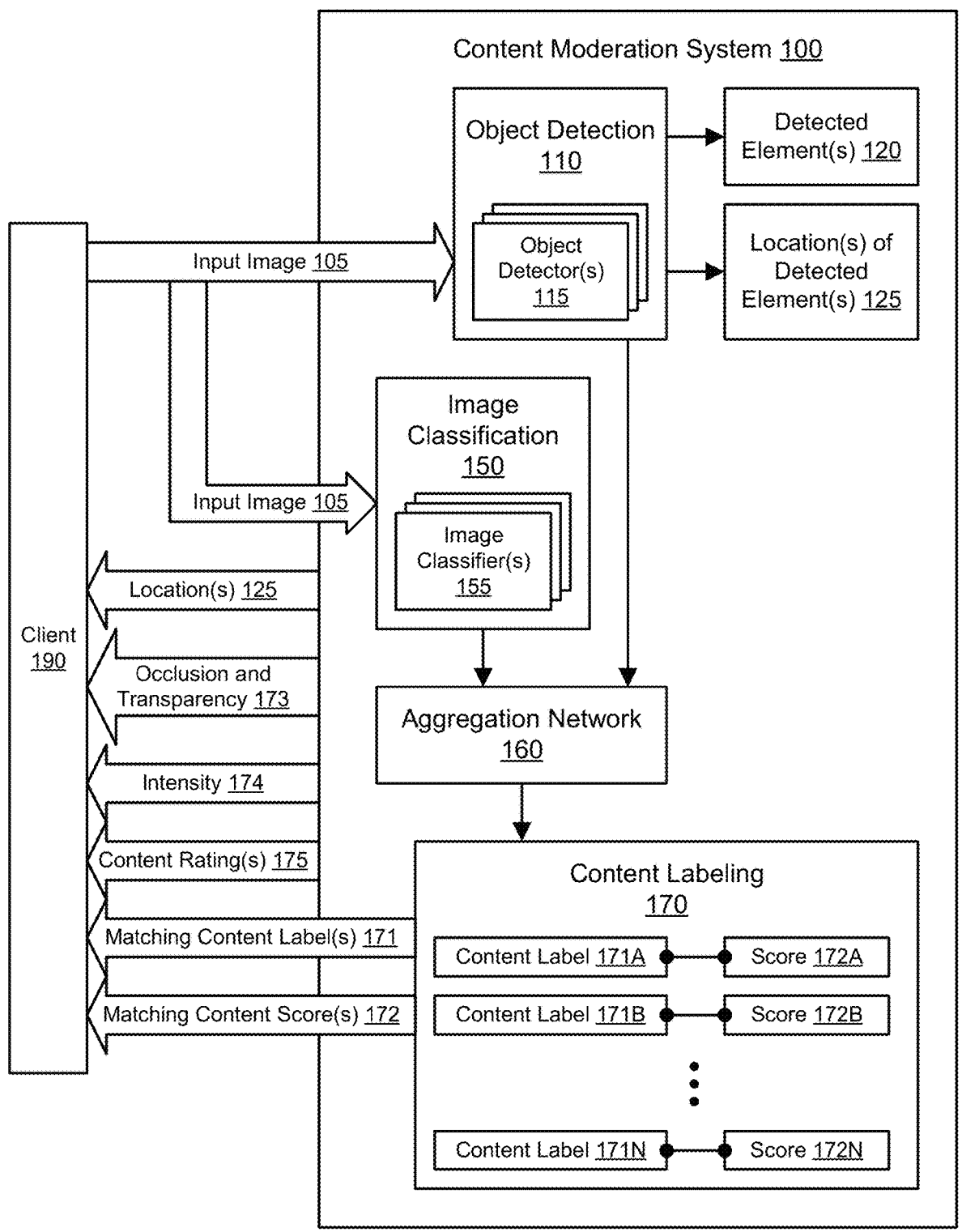
FIG. 4A and FIG. 4B illustrate further aspects of the example system environment for content moderation using object detection and image classification, including a two-stream approach, according to some embodiments.

FIG. 4A illustrates further aspects of the example system environment for content moderation using object detection and image classification, including a two-stream approach, according to some embodiments. Using the two-stream approach, the object detection 110 and image classification 150 may be performed concurrently or in parallel such that the image classification does not necessarily use any outputs of the object detection. The original input image 105 may be provided as input to both the object detection 110 and image classification 150. In some embodiments, additional models may be used in parallel to the object detection 110 and image classification 150 to enhance the accuracy of the image analysis. By performing the object detection 110 and image classification 150 concurrently, the content moderation system 100 may produce the outputs (e.g., the content label(s) 171) more quickly than if the object detection and image classification were performed sequentially.

As discussed above, the object detection 110 may output information describing one or more detected elements 120 in the input image 105. The information describing one of the detected elements 120 may include, for example, the name of the object class that was detected, a score representing a confidence level that the object was properly detected, the number of instances of the object class in the input image 105, a degree to which the object is uncovered or transparent, and/or other metadata describing the detected element(s). In some embodiments, the object detection 110 may output location information 125 describing the location(s) of one or more detected elements in the input image 105, and the location information 125 may be reported to the client 190. In some embodiments, the image cropping component may produce, for each of the detected element(s) 120, a cropped portion of the original input image. The location data 125 may be used to generate image crop(s) representing portions of the input image 105 containing the detected element(s) 120. In some embodiments, a particular image crop for a particular element may be produced by removing the portions of the original image 105 outside of the bounding box for that element. In some embodiments, output of the object detection 110 stage may include a feature vector for each of the image crop(s) and/or one or more scores for one or more content categories associated with the detected element(s).

As also discussed above, the image classification 150 may analyze the input image 105 and assign the input image to one or more categories of objectionable content such as "suggestive," "violent," "hate speech," and so on. The image classification 150 may generate output values (e.g., one or more feature vectors) for the input image 105 with respect to the one or more categories of objectionable content. The image classification 150 may assign scores for the input image 105 in one or more categories of objectionable content.

The content moderation system 100 may include an aggregation network 160 that aggregates outputs of the object detection 110 and image classification 150 in the two-stream approach. The aggregation network 160 may take, as input, values such as raw scores, feature vectors, and so on. The aggregation network 160 may be implemented using machine learning techniques or deep learning models. For example, the aggregation network 160 may be implemented using linear regression techniques, support-vector machines, decision trees, deep neural networks, and so on. The aggregation network 160 may output the final raw scores for the fine-grained content labels 171A-171N. As discussed above, the raw scores may be processed or calibrated to produce the scores 172A-172N that are used to determine the content labeling 170 for the input image 105.

Figure 4B:
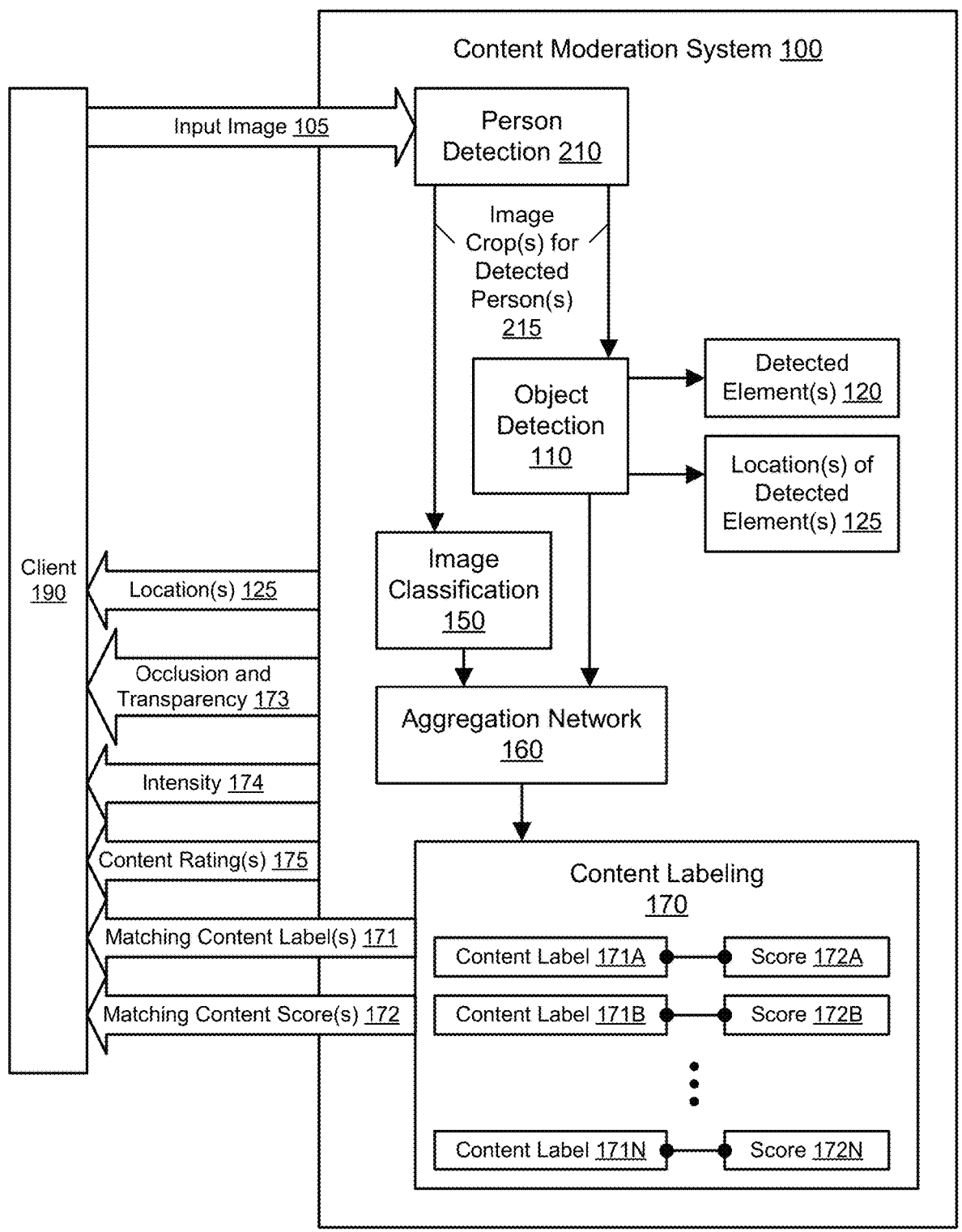

FIG. 4B illustrates further aspects of the example system environment for content moderation using object detection and image classification, including a two-stream approach plus the use of a person detector, according to some embodiments. A component 210 for person detection may use object detection techniques to identify one or more persons in the input image 105. As discussed above with respect to object detection 110, the person detection 210 may include one or more object detectors that are trained to identify human forms using machine learning techniques. The person detection 210 may output one or more image crops 215 including the detected person(s) but excluding other portions of the input image 105, e.g., where the crops 215 are generated using bounding boxes or other location information for the detected person(s). In some embodiments, the person detection 210 may output the bounding boxes or other location information for the detected person(s) to the client 190. By performing the object detection 110 and image classification 150 on particular portions of the input image 105 that represent humans and not necessarily on less relevant portions of the input image, the accuracy of the image analysis for content moderation may be improved.

Figure 5A:
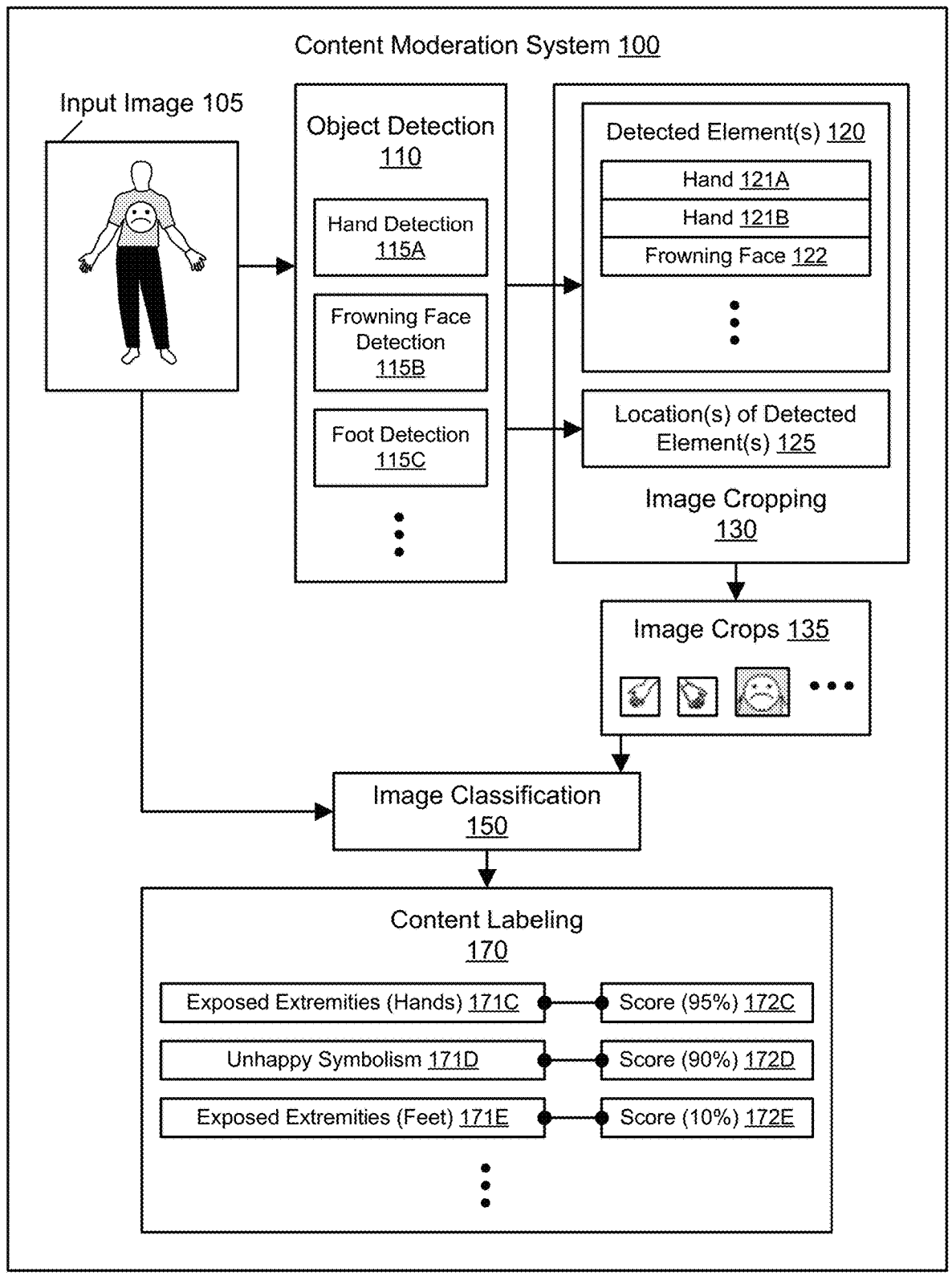
FIG. 5A and FIG. 5B illustrate further aspects of the example system environment for content moderation using object detection and image classification, including an example of automated detection of elements of an input image, according to some embodiments.

FIG. 5A illustrates further aspects of the example system environment for content moderation using object detection and image classification, including an example of automated detection of elements of an input image, according to some embodiments. As shown in the example of FIG. 5A, the input image 105 may depict a standing figure wearing a shirt with a "frowning face" symbol. The figure has exposed arms, hands, and head but is otherwise fully covered. The object detection 110 may use one or more object detectors 115 to perform hand detection 115A, and frowning face detection 115B, and foot detection 115C, among other objects. Based on the example image 105, the object detection 110 may identify one hand 121A, another hand 121B, and the frowning face 122.

The image cropping 135 may produce cropped images 135 including a cropped version of the first hand 121A, a cropped version of the second hand 121B, and a cropped version of the frowning face 122. The image crops 135 and the original image 105 may be provided to the image classification 150 to assign scores for the input image in one or more categories of content. One or more content labels may be assigned to the image 105 based (at least in part) on the output of the image classification 150. For example, the image 105 may be assigned a final score of 95% 172C for an "exposed extremities (hands)" content category 171C due (at least in part) to the presence of the hand elements 121A and 121B, and that label may be assigned to the image because the score is higher than some threshold value. Similarly, the image 105 may be assigned a final score of 90% 172D for an "unhappy symbolism" category 171C due (at least in part) to the presence of the frowning face element 122, and that label may be assigned to the image because the score is higher than some threshold value.

As another example, the image 105 may be assigned a final score of 10% 172E for an "exposed extremities (feet)" content category 171E due (at least in part) to the presence of the covered feet in the image 105 but not the presence of uncovered feet. That label may not be assigned to the image because the score is lower than some threshold value. In some embodiments, the object detection 110 may be configured to detect variations on object classes such as body parts that are fully covered (e.g., by clothing or some other object), partially covered, fully uncovered, semi-transparent, covered by a semi-transparent layer, and so on. For example, the foot detection 115C may be configured to detect the shoes or sock feet of the standing figure and not only exposed feet. If the foot detection 115C detects the shoes or sock feet and the image classification 150 has been trained to classify images with shoes or sock feet, the system 100 may ultimately assign the image to a category of "covered extremities (feet)" instead of "exposed extremities (feet)." Similarly, if the figure's socks are partially covering the feet, the system 100 may ultimately assign the image to a category of "partially covered extremities (feet)/"

Figure 5B:
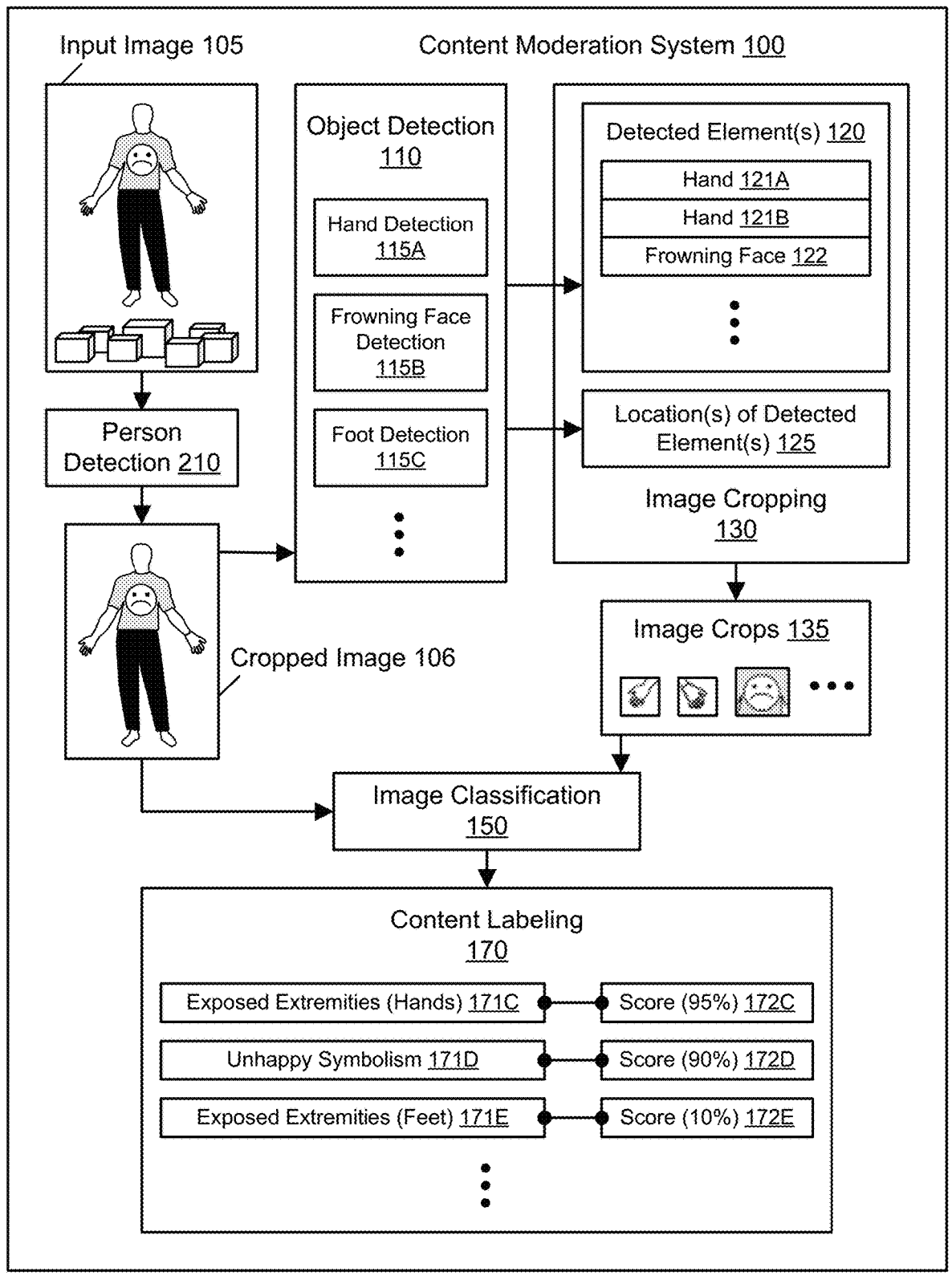

As shown in FIG. 5B, a cropped image 106 with the person may be generated from a larger image 105 using a component for person detection 210. As shown for purposes of illustration, the larger image 105 may include whitespace around the figure as well as a set of boxes beneath the figure that may not be relevant to content moderation. The boxes and some of the whitespace may be removed in the cropped image 106 resulting from use of the person detection 210. The cropped image 106 may be provided as input to the object detection 110 and image classification 150. The person shown in the cropped image 105 may be the only person in the original, larger image 105 or may be one of several persons identified in the larger image. In the latter case, the operations shown in FIG. 5B may be performed for each of the cropped images corresponding to one of the persons in the larger image.

Figure 6:
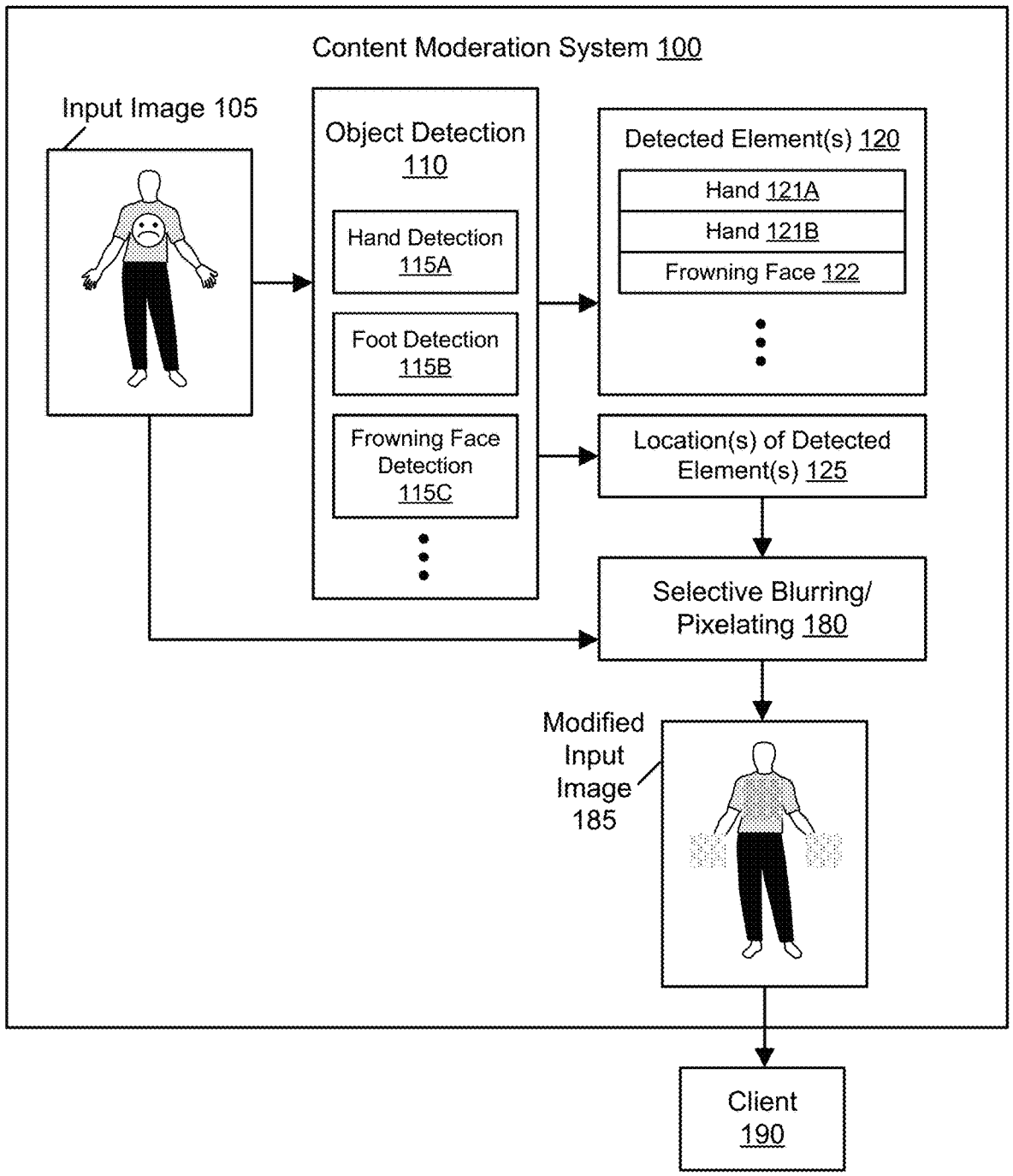
FIG. 6 illustrates further aspects of the example system environment for content moderation using object detection and image classification, including an example of automated blurring or pixelation of elements of an input image, according to some embodiments.

FIG. 6 illustrates further aspects of the example system environment for content moderation using object detection and image classification, including an example of automated blurring or pixelation of elements of an input image, according to some embodiments. As discussed above, the object detection 110 may output location information 125 describing the location(s) of one or more detected elements in the input image 105. For example, for a particular element of objectionable content, the location data 125 may include a bounding box representing two-dimensional coordinates within the image in which the element is found. As another example, for a particular element of objectionable content, the location data 125 may include center and radius representing a circle within the image in which the element is found.

In some embodiments, the location data 125 may be used to blur, pixelate, or otherwise obscure portions of the input image 105 containing the detected element(s). The content moderation system 100 may include a component for selective blurring/pixelation 180. For the example image 105, the selective blurring/pixelation may generate a modified input image 185 based (at least in part) on the original input image 105 as well as the location data 125. In the modified input image 185, a region corresponding to the location of the one hand 121A may be blurred, pixelated, blacked out, or otherwise obscured. Similarly, in the modified input image 185, a region corresponding to the location of the other hand 121B may be blurred, pixelated, blacked out, or otherwise obscured. Additionally, in the modified input image 185, a region corresponding to the location of the frowning face 122 may be blurred, pixelated, blacked out, or otherwise obscured.

In some embodiments, the selective blurring/pixelation 180 may be performed or not performed according to preferences of the client 190. In some embodiments, the selective blurring/pixelation 180 may blur or pixelate some types of detected objects but not others. The modified image 185 may be provided to the client 190. The client 190 may replace the input image 105 with the modified input image 195 in a discussion forum, social media network, or other Internet-accessible channel in which end users can post images or video.

Figure 7A:
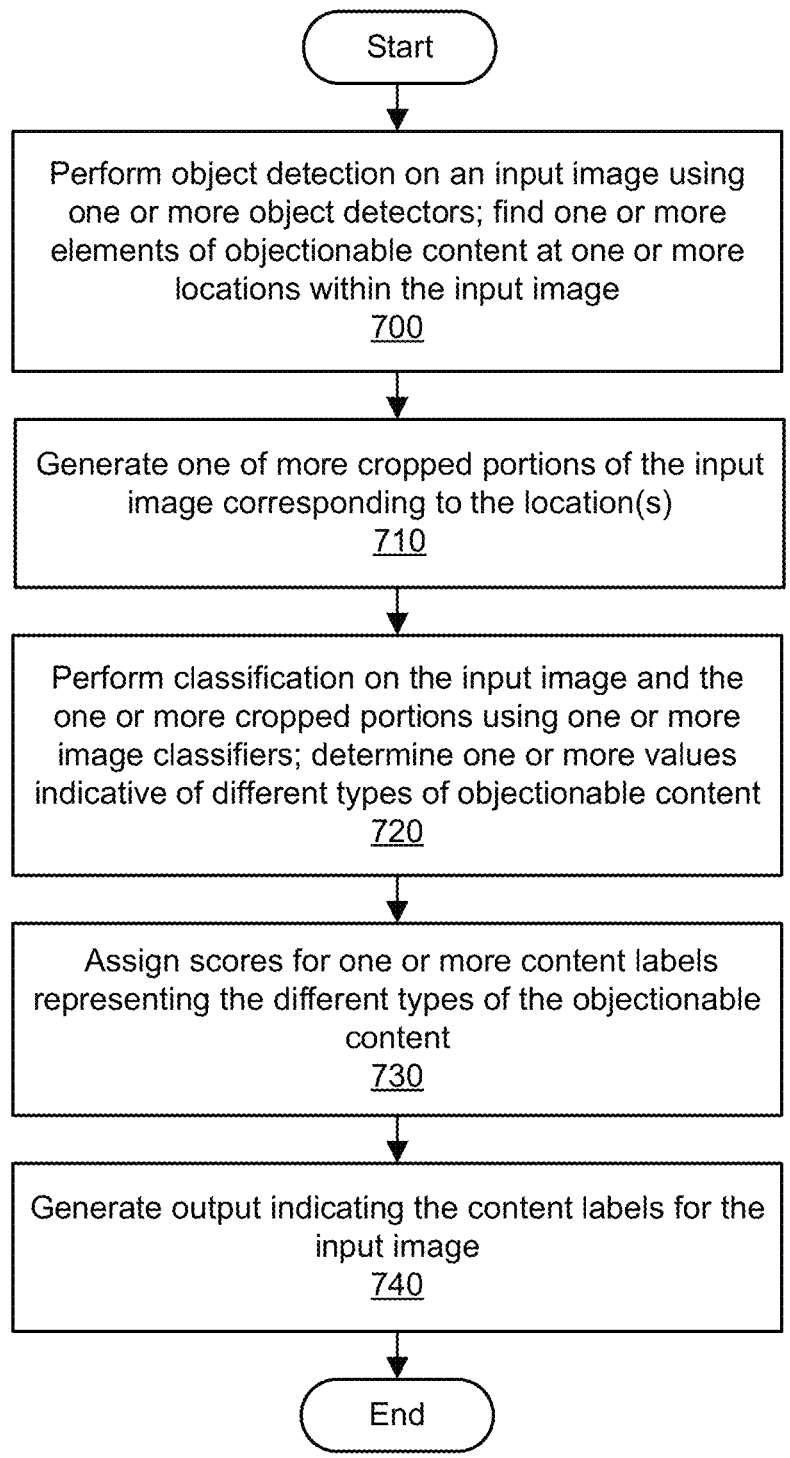
FIG. 7A and FIG. 7B are flowcharts illustrating methods for content moderation using object detection and image classification, according to some embodiments.
Figure 7B:
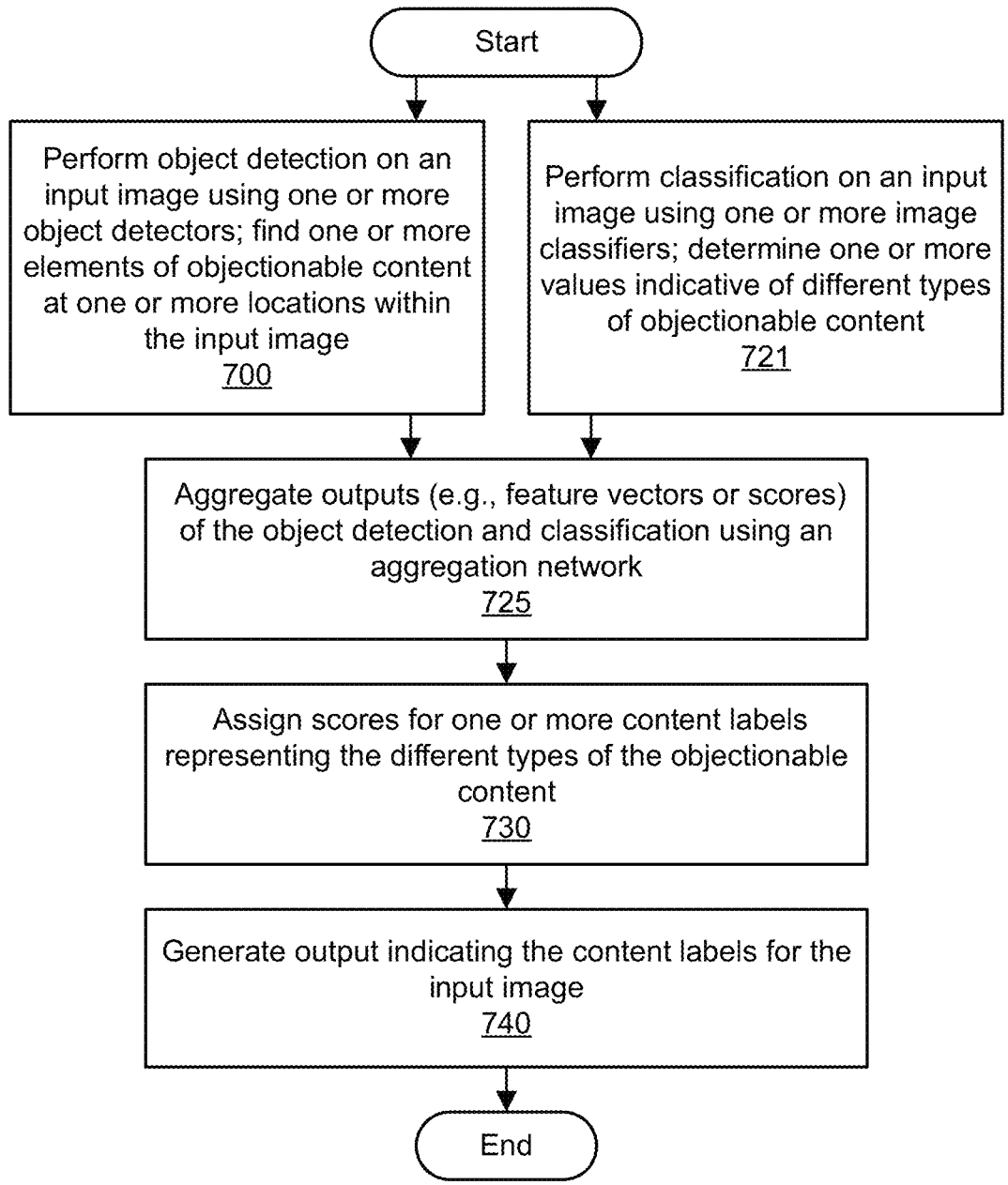

FIG. 7A and FIG. 7B are flowcharts illustrating methods for content moderation using object detection and image classification, according to some embodiments. FIG. 7A represents a two-stage solution according to some embodiments. In some embodiments, images (including video frames) may be assessed by a content moderation system according to a set of content standards. As shown in 700, object detection may be performed on an input image using one or more object detectors. The object detection may find one or more elements of objectionable content at one or more locations within the input image. The object detector(s) may be implemented using computer vision and image processing techniques to detect instances of objects in digital images. The object detector(s) may represent one or more machine learning models or deep learning models. For example, the object detector(s) may be configured to detect various body parts that are often associated with suggestive or "Not Safe for Work" imagery, weapons that are often associated with violent imagery, hate symbols that are often associated with bigotry, and so on. In some embodiments, the object detector(s) may be configured to detect variations on object classes such as body parts that are fully covered (e.g., by clothing or some other object), partially covered, fully uncovered, semi-transparent, covered by a semi-transparent layer, and so on.

The object detection may output information describing one or more detected elements in the input image. The information describing one of the detected elements may include, for example, the name of the object class that was detected, a score representing a confidence level that the object was properly detected, the number of instances of the object class in the input image, a degree to which the object is uncovered or transparent, and/or other metadata describing the detected element(s). In some embodiments, the object detection may output location information describing the location(s) of one or more detected elements in the input image. For example, for a particular element of objectionable content, the location data may include a bounding box representing two-dimensional coordinates within the image in which the element is found.

As shown in 710, the method may generate one or more cropped portions of the input image corresponding to the location(s) of the detected element(s). The image cropping may produce, for each of the detected element(s), a cropped portion of the original input image. The location data may be used to generate image crop(s) representing portions of the input image containing the detected element(s). In some embodiments, a particular image crop for a particular element may be produced by removing the portions of the original image outside of the bounding box for that element.

As shown in 720, image classification may be performed on the input image and also on the cropped portions of the image using one or more image classifiers. The image classifier(s) may be implemented using computer vision and image processing techniques to classify digital images in one or more classes. The image classifier(s) may represent one or more machine learning models or deep learning models. The classification may determine one or more values indicative of different categories or types of objectionable content. For example, the image classifier(s) may be used to analyze the input image and the cropped portions and assign the input image to one or more categories such as "suggestive," "violent," "hate speech," and so on. The output values may represent respective scores for the various categories.

As shown in 730, scores for one or more content labels may be assigned to the input image. The content labels may represent the different types or categories of objectionable content. As discussed above, the labels may describe broader categories of objectionable content such as "suggestive," "violent," "hate speech," and so on. The labels may describe narrower categories of objectionable content within the broader categories. The content labeling may use the scores generated by the image classification or the processed or calibrated version of those scores. The content labeling may assign the input image to one or more categories of content according to threshold values. For example, the input image may be assigned to a particular content label because the score for that label exceeds a threshold value.

As shown in 740, the method may generate output indicating the content labels and provide this output to the client that asked for analysis of the input image. The content labeling may include selecting one or more content labels from a larger set of content labels. In some embodiments, the method may report the scores for one or more categories of objectionable content that the image matches. In some embodiments, the method may report the degree to which detected objects are covered or transparent (e.g., partially covered, fully uncovered, and so on). In some embodiments, the method may report the location(s) of the objectionable elements within the input image. Using this fine-grained output, Internet-accessible services in which users provide images and video may be moderated automatically, quickly, and effectively.

FIG. 7B represents a two-stream solution according to some embodiments. In some embodiments, images (including video frames) may be assessed by a content moderation system according to a set of content standards. As shown in 700, object detection may be performed on an input image using one or more object detectors. The object detection may find one or more elements of objectionable content at one or more locations within the input image. The object detector(s) may be implemented using computer vision and image processing techniques to detect instances of objects in digital images. The object detector(s) may represent one or more machine learning models or deep learning models. For example, the object detector(s) may be configured to detect various body parts that are often associated with suggestive or "Not Safe for Work" imagery, weapons that are often associated with violent imagery, hate symbols that are often associated with bigotry, and so on. In some embodiments, the object detector(s) may be configured to detect variations on object classes such as body parts that are fully covered (e.g., by clothing or some other object), partially covered, fully uncovered, semi-transparent, covered by a semi-transparent layer, and so on.

The object detection may output information describing one or more detected elements in the input image. The information describing one of the detected elements may include, for example, the name of the object class that was detected, a score representing a confidence level that the object was properly detected, the number of instances of the object class in the input image, a degree to which the object is uncovered or transparent, and/or other metadata describing the detected element(s). In some embodiments, the object detection may output location information describing the location(s) of one or more detected elements in the input image. For example, for a particular element of objectionable content, the location data may include a bounding box representing two-dimensional coordinates within the image in which the element is found.

As shown in 721, image classification may be performed on the input image using one or more image classifiers. The image classification shown in 721 may be performed concurrently with the object detection shown in 700. The image classifier(s) may be implemented using computer vision and image processing techniques to classify digital images in one or more classes. The image classifier(s) may represent one or more machine learning models or deep learning models. The classification may determine one or more values indicative of different categories or types of objectionable content. For example, the image classifier(s) may be used to analyze the input image and the cropped portions and assign the input image to one or more categories such as "suggestive," "violent," "hate speech," and so on. The output values may represent respective scores or feature vectors for the various categories.

As shown in 725, outputs of the object detection and image classification may be aggregated. The aggregation may take, as input, values such as raw scores, feature vectors, and so on. The aggregation may be performed by an aggregation network. The aggregation network may be implemented using machine learning techniques or deep learning models. For example, the aggregation network may be implemented using linear regression techniques, support-vector machines, decision trees, deep neural networks, and so on. The aggregation network may output the final raw scores for the fine-grained content labels. As discussed above, the raw scores may be processed or calibrated to produce the scores that are used to determine the content labeling for the input image.

As shown in 730, scores for one or more content labels may be assigned to the input image. The content labels may represent the different types or categories of objectionable content. As discussed above, the labels may describe broader categories of objectionable content such as "suggestive," "violent," "hate speech," and so on. The labels may describe narrower categories of objectionable content within the broader categories. The content labeling may use the scores generated by the aggregation network or the processed or calibrated version of those scores. The content labeling may assign the input image to one or more categories of content according to threshold values. For example, the input image may be assigned to a particular content label because the score for that label exceeds a threshold value.

As shown in 740, the method may generate output indicating the content labels and provide this output to the client that asked for analysis of the input image. The content labeling may include selecting one or more content labels from a larger set of content labels. In some embodiments, the method may report the scores for one or more categories of objectionable content that the image matches. In some embodiments, the method may report the degree to which detected objects are covered or transparent (e.g., partially covered, fully uncovered, and so on). In some embodiments, the method may report the location(s) of the objectionable elements within the input image. Using this fine-grained output, Internet-accessible services in which users provide images and video may be moderated automatically, quickly, and effectively.

Illustrative Computer System

In at least some embodiments, a computer system that implements a portion or all of one or more of the technologies described herein may include a general-purpose computer system that includes or is configured to access one or more computer-readable media. FIG. 8 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of at least one computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. When used in the claims, the term "or" is used as an inclusive or and not as an exclusive or. For example, the phrase "at least one of x, y, or z" means any one of x, y, and z, as well as any combination thereof.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
  a content moderation system comprising one or more processors and one or more memories to store computer-executable instructions that, when executed, cause the one or more processors to:
    perform object detection on an input image using one or more object detectors, wherein the object detection finds one or more elements representing objectionable content in the input image, and wherein, for one or more individual elements of the one or more elements, the object detection determines one or more bounding boxes in which the one or more elements are found;
    generate one or more cropped portions of the input image based at least in part on the one or more bounding boxes;
    perform classification on the input image and the one or more cropped portions of the input image using one or more image classifiers, wherein the classification determines one or more scores for one or more content labels descriptive of one or more objectionable content types, and wherein at least one of the scores represents a finding of one or more of the objectionable content types in the input image; and
    generate output indicating the finding of the one or more of the objectionable content types and the one or more bounding boxes.

2. The system as recited in claim 1, wherein the output indicates one or more content labels descriptive of the one or more objectionable content types of the one or more elements representing objectionable content.

3. The system as recited in claim 1, wherein the output indicates a degree to which the one or more elements representing objectionable content are obscured in the input image.

4. The system as recited in claim 1, wherein the one or more memories store additional computer-executable instructions that, when executed, cause the one or more processors to:
  generate a modified input image in which the one or more elements representing objectionable content are blurred or pixelated inside the one or more bounding boxes; and
  output the modified input image.

5. A method, comprising:
  performing, by a content moderation system, object detection on an input image using one or more object detectors, wherein the object detection finds one or more elements in the input image;
  performing, by the content moderation system, classification based at least in part on the input image using one or more image classifiers, wherein the classification determines one or more values indicative of one or more content types in the input image;
  determining, by the content moderation system, one or more scores for one or more content labels corresponding to the one or more content types, and wherein at least one of the scores represents a finding of one or more of the content types in the input image; and
  generating, by the content moderation system, output indicating the finding of the one or more of the content types.

6. The method as recited in claim 5, wherein the one or more content types represent one or more objectionable content types, wherein the one or more elements represent one or more elements of objectionable content, wherein the one or more content labels are descriptive of the one or more objectionable content types, and wherein the output indicates the one or more content labels descriptive of the one or more objectionable content types of the one or more elements.

7. The method as recited in claim 6, wherein the output indicates the one or more scores for the one or more content labels.

8. The method as recited in claim 5, wherein, for one or more individual elements of the one or more elements, the object detection determines location information describing one or more locations in the input image in which the one or more elements are found, and wherein the output indicates the location information.

9. The method as recited in claim 8, further comprising:
  generating, by the content moderation system, one or more cropped portions of the input image based at least in part on the location information, wherein the one or more cropped portions comprise the one or more elements, and wherein the classification is performed based at least in part on the one or more cropped portions.

10. The method as recited in claim 9, further comprising:
  expanding, by the content moderation system, the one or more cropped portions of the input image such that additional image information is captured.

11. The method as recited in claim 5, wherein the input image represents a frame of a digital video, wherein the output is generated using aggregation of scores associated with the one or more content types for a plurality of individual frames of the digital video, and wherein the output comprises one or more indications of one or more times at which elements of the one or more content types are detected in the digital video.

12. The method as recited in claim 5, wherein the output indicates a degree to which the one or more elements are obscured or transparent in the input image.

13. The method as recited in claim 5, further comprising:
  generating, by the content moderation system, a modified input image in which the one or more elements are obscured; and
  outputting, by the content moderation system, the modified input image.

14. One or more non-transitory computer-readable storage media storing program instructions that, when executed on or across one or more processors, perform:

performing object detection on an input image using one or more object detectors, wherein the object detection finds one or more elements representing objectionable content in the input image;

performing classification on the input image using one or more image classifiers, wherein the classification determines one or more values indicative of one or more objectionable content types in the input image;

performing aggregation of information describing the one or more elements representing objectionable content and the one or more values indicative of the one or more objectionable content types, wherein the aggregation determines one or more scores for one or more content labels corresponding to the one or more objectionable content types, and wherein at least one of the scores represents a finding of one or more of the objectionable content types in the input image; and generating output indicating the finding of the one or more of the objectionable content types.

15. The one or more non-transitory computer-readable storage media as recited in claim 14, wherein, for one or more individual elements of the one or more elements, the object detection determines one or more bounding boxes in which the one or more elements are found, and wherein the output indicates the one or more bounding boxes.

16. The one or more non-transitory computer-readable storage media as recited in claim 15, wherein the one or more storage media store additional program instructions that, when executed on or across the one or more processors, perform:

generating a modified input image in which the one or more elements representing objectionable content are blurred or pixelated inside the one or more bounding boxes; and outputting the modified input image.

17. The one or more non-transitory computer-readable storage media as recited in claim 14, wherein the one or more storage media store additional program instructions that, when executed on or across the one or more processors, perform:

detecting one or more persons in a larger image using a person detector, wherein the input image is generated using cropping of the larger image to exclude image data not associated with the one or more persons.

18. The one or more non-transitory computer-readable storage media as recited in claim 14, wherein the output indicates an intensity of the one or more elements representing objectionable content in the input image.

19. The one or more non-transitory computer-readable storage media as recited in claim 14, wherein the object detection and the classification are performed concurrently.

20. The one or more non-transitory computer-readable storage media as recited in claim 14, wherein the aggregation is performed using an aggregation network that implements one or more machine learning techniques.

* * * * *